United States Patent
Park et al.

(10) Patent No.: US 9,272,339 B2
(45) Date of Patent: Mar. 1, 2016

(54) VARIABLE MACHINE TOOL CAPABLE OF MULTI-AXIS MACHINING

(71) Applicant: KOREA INSTITUTE OF MACHINERY & MATERIALS, Daejeon (KR)

(72) Inventors: Jong-Kweon Park, Daejeon (KR); Sung Cheul Lee, Daejeon (KR); Seung Kook Ro, Daejeon (KR); Byung-Sub Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 466 days.

(21) Appl. No.: 13/707,784

(22) Filed: Dec. 7, 2012

(65) Prior Publication Data
US 2014/0023450 A1    Jan. 23, 2014

(30) Foreign Application Priority Data
Jul. 19, 2012    (KR) .......................... 10-2012-0078735

(51) Int. Cl.
*B23C 1/12*    (2006.01)
*B23Q 1/01*    (2006.01)
(Continued)

(52) U.S. Cl.
CPC . *B23C 1/12* (2013.01); *B23Q 1/015* (2013.01); *B23Q 1/44* (2013.01); *B23Q 1/5406* (2013.01);
(Continued)

(58) Field of Classification Search
CPC ........... Y10T 409/307672; Y10T 409/308232; Y10T 409/308512; Y10T 408/93; B23Q 2210/006; B23Q 1/5425; B23Q 1/5406; B23Q 1/5412; B23C 1/12; B23C 2220/32; B23C 3/16

USPC ........................... 409/201, 211, 216; 408/236
See application file for complete search history.

(56) References Cited

U.S. PATENT DOCUMENTS 2,042,720 A * 6/1936 Lindner ........................ 408/236
2,948,168 A    8/1960 Mccormick
(Continued)

FOREIGN PATENT DOCUMENTS

EP    2 181 800    5/2010
EP    2 386 382    11/2011
(Continued)

OTHER PUBLICATIONS

Woo-Cheol Shin et al., "Investigation for Clamping Properties of the Tool Clamping Device Based on the Shape Memory Alloy for Application of a Micro Spindle System," Transactions of the Korean Society of Machine Tool Engineers, vol. 16, No. 6, (Dec. 2007).

*Primary Examiner* — Erica E Cadugan
(74) *Attorney, Agent, or Firm* — Lex IP Meister, PLLC

(57) ABSTRACT

According to an exemplary embodiment of the present invention, a variable machine tool capable of multi-axis machining includes: a base frame; a first rotating frame rotating on the base frame and comprising a first sliding member sliding along a circumference while being contact-supported through an interior diameter; a second rotating frame cross-disposed inside the first rotating frame to rotate in a direction crossing the first rotating frame, and comprising a second sliding member sliding along a circumference while being contact-supported through an interior diameter; and a spindle of which position and posture displacement is adjusted when the first sliding member and the second sliding member slide by interworking with rotation of the first rotating frame and the second rotating frame, the spindle being installed while passing through the first sliding member and the second sliding member.

7 Claims, 6 Drawing Sheets

(51) Int. Cl.
*B23Q 1/03* (2006.01)
*B23Q 1/54* (2006.01)
*B23Q 11/00* (2006.01)
*B23Q 1/44* (2006.01)

(52) U.S. Cl.
CPC ............... B23Q 1/5425 (2013.01); *B23Q 1/03* (2013.01); *B23Q 11/0032* (2013.01); *B23Q 2210/006* (2013.01); *Y10T 409/304088* (2015.01); *Y10T 409/304312* (2015.01); *Y10T 409/308512* (2015.01); *Y10T 409/309576* (2015.01)

(56) References Cited

U.S. PATENT DOCUMENTS

| | | | |
|---|---|---|---|
| 4,628,765 | A | 12/1986 | Dien |
| 6,503,033 | B1 * | 1/2003 | Kim et al. ............. 409/201 |
| 2006/0213306 | A1 | 9/2006 | Hayes |
| 2006/0291951 | A1 | 12/2006 | Van Zile, III |
| 2009/0154912 | A1 | 6/2009 | Lin |
| 2011/0280680 | A1 * | 11/2011 | Park et al. ............. 409/211 |
| 2014/0109367 | A1 * | 4/2014 | Park et al. ............. 29/56.5 |

FOREIGN PATENT DOCUMENTS

| | | |
|---|---|---|
| JP | 05-026519 | 4/1993 |
| JP | 08-267257 | 10/1996 |
| JP | 2000-230548 | 8/2000 |
| JP | 4310301 | 4/2006 |
| JP | 2009-058078 | 3/2009 |
| JP | 2010-105146 | 5/2010 |
| JP | 2011-512262 | 4/2011 |
| JP | 2011-240480 | 12/2011 |
| KR | 10-0355174 | 1/2002 |
| KR | 10-0502457 | 7/2003 |
| KR | 10-2004-0082433 | 9/2004 |
| KR | 10-0471749 | 2/2005 |
| KR | 10-0957524 | 5/2010 |
| KR | 10-1043925 | 11/2010 |
| KR | 10-2011-0125938 | 11/2011 |
| KR | 10-1144621 | 11/2011 |
| WO | 2009/069155 | 6/2009 |

* cited by examiner

VARIABLE MACHINE TOOL CAPABLE OF MULTI-AXIS MACHINING

CROSS-REFERENCE TO RELATED APPLICATION

This application claims priority to and the benefit of Korean Patent Application No. 10-2012-0078735 filed in the Korean Intellectual Property Office on Jul. 19, 2012, the entire contents of which are incorporated herein by reference.

BACKGROUND OF THE INVENTION (a) Field of the Invention

The present invention relates to a variable machine tool capable of multi-axis machining, and more particularly, to a variable machine tool capable of multi-axis machining capable of performing 5 axes processing, to which an apparatus mechanism in which a rotary motion is maximized through a two-axial rotary motion and three-axial translation is applied, thereby improving processability compared to a variable machine tool capable of multi-axis machining in the related art, and thus being utilized in various fields (for example, BT and IT micro processing fields).

(b) Description of the Related Art

A representative introduced apparatus used for three-dimensional processing of a processing target includes a laser processing apparatus and a multi-axis machine tool. The laser processing apparatus is mainly used for processing a processing target having a relatively small volume, but the multi-axis machine tool is mainly used for processing a target having a relatively large volume.

However, since most of the multi-axis machine tools have a large body volume, and a tool performs processing while moving vertically, forward and backward, and horizontally around a processing target of which a position is fixed on a table in order to three-dimensionally process the processing target, a processing error is increased according to an increase in a movement distance of the tool, thereby causing slight difficulty in processing a product with a fine and complicated shape.

Further, since most of the multi-axis machine tools perform the processing of a processing target only with the multi-axis translation, a structure thereof is comparatively complex and there are many number of components included in the multi-axis machine tool, so that a price thereof is high.

Further, the larger amount of movement of the tool is demanded in order to process a product with a complex shape, there is a disadvantage in that unnecessary energy consumption becomes severe.

In order to solve the above problem, development of a variable machine tool capable of multi-axis machining with a novel concept having a driving mechanism in which a rotary motion is maximized has been essentially demanded.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a variable machine tool capable of multi-axis machining having advantages of improving processability compared to a variable machine tool capable of multi-axis machining in the related art to be used even in various micro processing fields by applying an apparatus mechanism in which a rotary motion is maximized.

The present invention has been made in an effort to provide a variable machine tool capable of multi-axis machining having advantages of capable of performing more complex and finer processing with a decreased volume of the apparatus by employing a mechanical structure to which a rotary motion and translation are simultaneously applied.

The present invention has been made in an effort to provide a variable machine tool capable of multi-axis machining having advantages of capable of more finely performing three-dimensional processing on a processing target by adopting a structure in which a single spindle is smoothly guidable in a predetermined direction by interworking with rotation of a pair of rotating frames arranged while crossing each other.

An object to be solved in the present invention is not limited to the aforementioned objects, and other objects not-mentioned herein will be clearly understood by those skilled in the art from descriptions below.

An exemplary embodiment of the present invention provides a variable machine tool capable of multi-axis machining, including: a base frame; a first rotating frame rotating on the base frame and including a first sliding member sliding along a circumference while being contact-supported through an interior diameter; a second rotating frame cross-disposed inside the first rotating frame to rotate in a direction crossing the first rotating frame, and including a second sliding member sliding along a circumference while being contact-supported through an interior diameter; and a spindle of which position and posture displacement is adjusted when the first sliding member and the second sliding member slide by interworking with rotation of the first rotating frame and the second rotating frame, the spindle being installed while passing through the first sliding member and the second sliding member, the spindle and the first sliding member are in a fixed contact state, but friction between the spindle and the second sliding member is decreased, so that the spindle is rotatably formed.

The base frame may include: a body portion including a ring-shaped upper body disposed at an outer side at an interval with the first rotating frame and a hemispherical lower body protruding to a lower side of the upper body; a support portion for making the body portion stand from a bottom to support the body portion; and a vibration isolation member interposed between the body portion and the support portion to absorb vibration, the vibration isolation member being disposed on the same line as a position at which the support portion is contact-supported to the bottom.

Further, a pair of first driving motors connected so as to rotate the first rotating frame and a pair of second driving motors connected so as to rotate the second rotating frame may be mounted on the upper body in a crossing direction, and a worktable on which a processing target is seated may be fixedly disposed in a hollow portion of the upper body, the worktable being fixedly supported by a plurality of connection members extending from the first driving motors and the second driving motors in a center direction.

Herein, the plurality of connection members may be installed in a structure without influencing a rotation route of each of the first rotating frame and the second rotating frame according to connection to a side surface of the worktable while passing through a plurality of arc-shaped elongated slits provided at the first rotating frame and the second rotating frame.

Further, an opening/closing door for discharging a chip may be provided at the lower body of the body portion.

In the meantime, cylindrical elongated slits may be formed at width centers of the first rotating frame and the second rotating frame along the circumferences, and the cylindrical elongated slit may have a width size so that the spindle turns along circumferences of the first rotating frame and the second rotating frame without friction in a state where the spindle passes through the cylindrical elongated slit.

Further, rail portions protruding so that the first sliding member and the second sliding member slide in a state where the first sliding member and the second sliding member slide are contact-supported to the rail portions, respectively, may be formed at interior diameter sides of the first rotating frame and the second rotating frame, respectively.

Further, a bearing member may be formed at the interior diameter of the second sliding member while being added to a surface facing the spindle so that the spindle is freely rotatable in a state where the spindle is in contact with the bearing member.

According to the variable machine tool capable of multi-axis machining according to the exemplary embodiment of the present invention, processability may be improved compared to the related art by applying a driving mechanism in which a rotary motion is maximized. Particularly, the variable machine tool capable of multi-axis machining according to the exemplary embodiment of the present invention may be used even in the BT and IT micro processing fields.

Particularly, by simultaneously applying a mechanical structure capable of performing a two-axial rotary motion and three-axial translation, it is possible to simplify a complex configuration of the multi-axis machine tool of the related art compared to the related art and perform more complex and finer processing.

Further, according to the variable machine tool capable of multi-axis machining according to the exemplary embodiment of the present invention, the spindle may be smoothly transferred in a predetermined direction by interworking with the rotation of the pair of rotating frames which are cross-arranged. This may be achieved by changing a design of a connection structure of the sliding members and the spindle provided between the respective rotating frames.

That is, the connection between the first sliding member and the spindle inside the first rotating frame may be fixed, and the second sliding member and the spindle inside the second rotating frame may be connected in a state where contact friction therebetween is decreased.

Accordingly, the spindle may hold an accurate posture toward the processing target while the position of the spindle is changed in a predetermined direction by interworking with the motions of the first rotating frame and the second rotating frame. As a result, processing accuracy, as well as processability, may be improved.

DETAILED DESCRIPTION OF THE EMBODIMENTS

Hereinafter, a variable machine tool capable of multi-axis machining (hereinafter, simply referred to as a "variable machine tool") according to an exemplary embodiment of the present invention will be described with reference to the accompanying drawings.

An advantage and a characteristic of the present invention, and a method for achieving the advantage and the characteristic may become clear with reference to the exemplary embodiments described in detail below with reference to the accompanying drawings. However, the present invention is not limited by exemplary embodiments disclosed below, but may be variously implemented into different forms. These embodiments are provided for full disclosure of the present invention and for full understanding of the scope of the present invention by those skilled in the art. In the following description, detailed explanation of known related functions and constitutions may be omitted to avoid unnecessarily obscuring the subject matter of the present invention.

Figure 1:
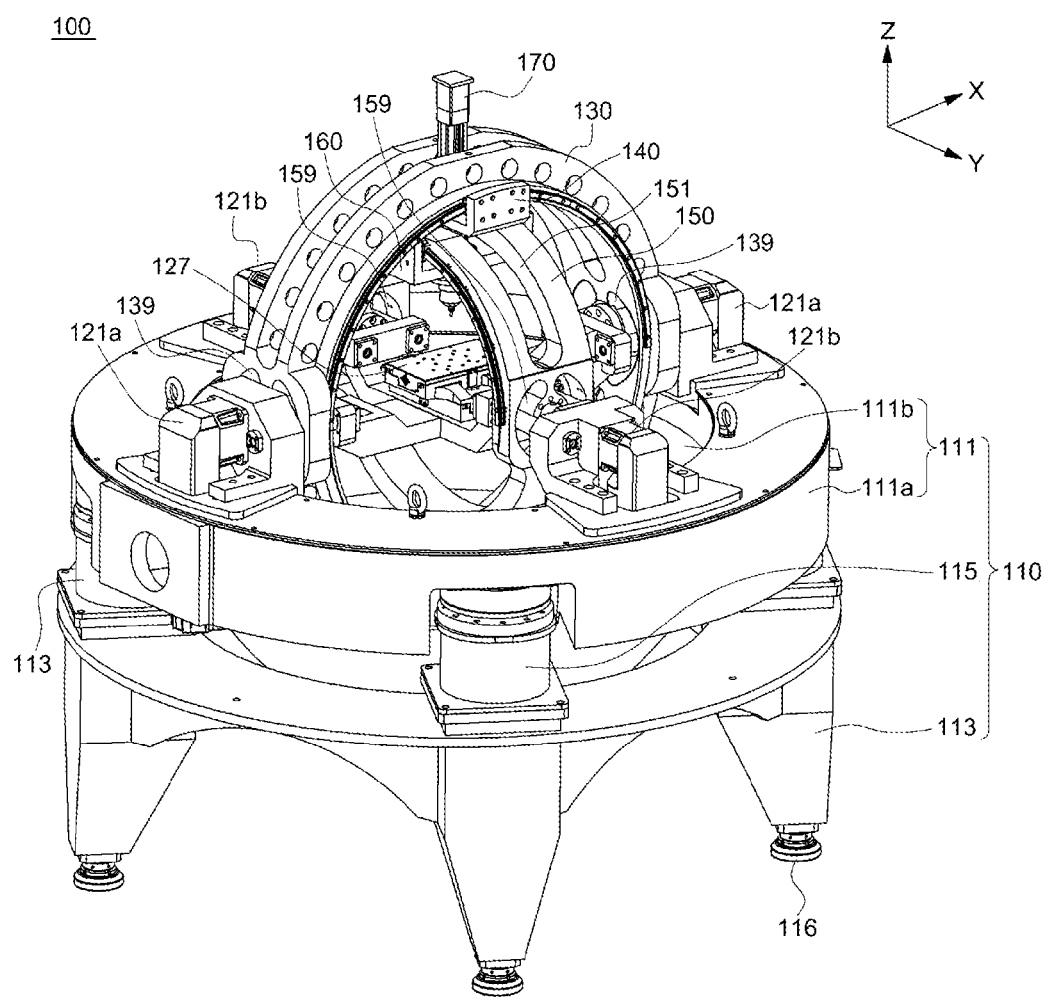
FIG. 1 is a perspective view of a variable machine tool capable of multi-axis machining according to the exemplary embodiment of the present invention.
Figure 2:
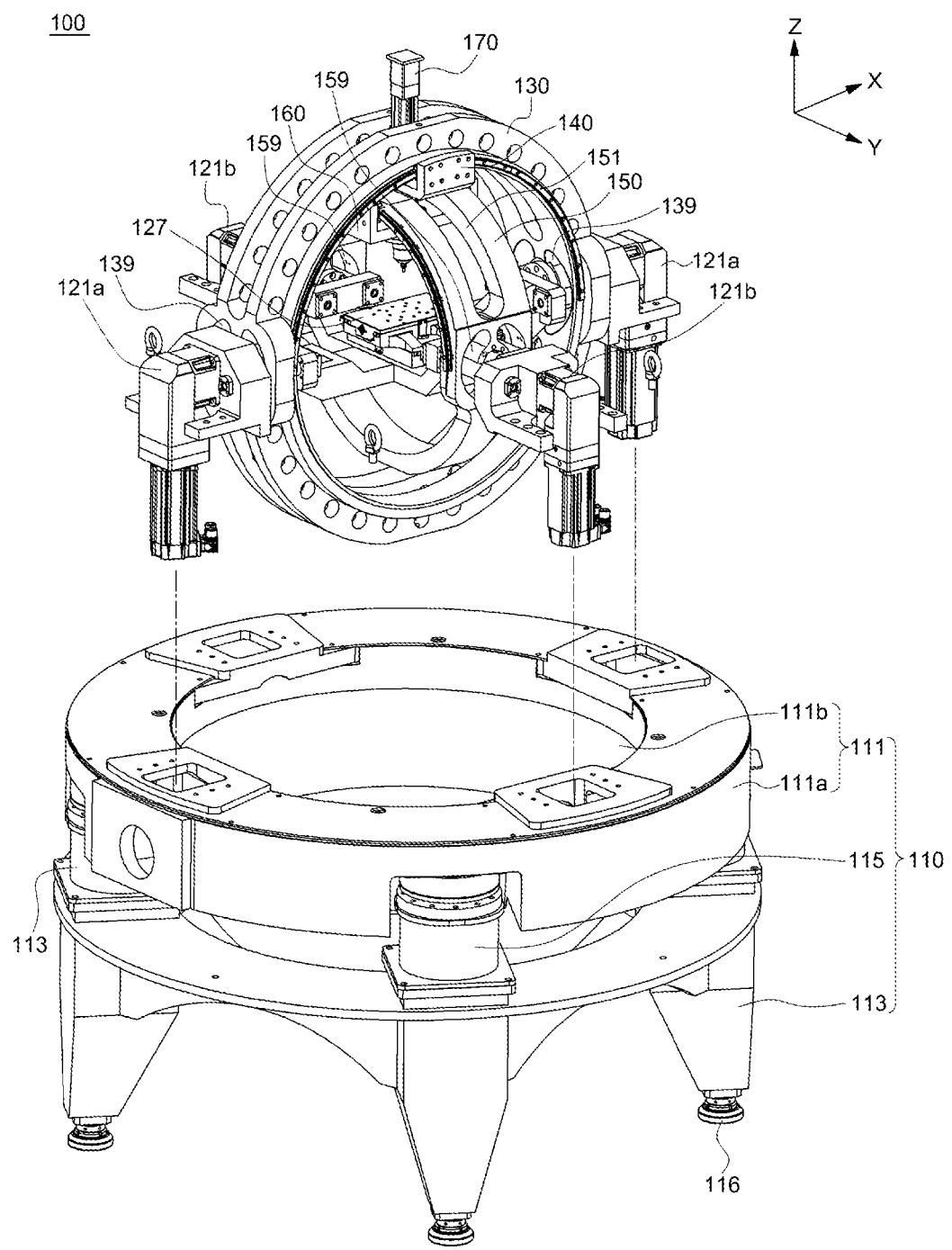
FIG. 2 is an exploded perspective view of the variable machine tool capable of multi-axis machining according to the exemplary embodiment of the present invention.

FIG. 1 is a perspective view of a variable machine tool capable of multi-axis machining according to the exemplary embodiment of the present invention, and FIG. 2 is an exploded perspective view of the variable machine tool capable of multi-axis machining according to the exemplary embodiment of the present invention.

Referring to FIGS. 1 and 2 together, the illustrated variable machine tool 100 includes a base frame 110, a first rotating frame 130 rotating on the base frame 110, a second rotating frame 150 rotating on the base frame 110 in a direction crossing the first rotating frame, and a spindle 170 of which a processing position and position displacement are adjusted by interworking with the rotation of the first rotating frame 130 and the second rotating frame 150.

Particularly, a first sliding member 140 contact-supported through an interior diameter to slide along a circumferential route is provided at the first rotating frame 130, and similarly a second sliding member 160 contact-supported through an interior diameter to slide along a circumferential route is provided at the second rotating frame 150. In this case, a fact that the spindle 170 is fixed to the first sliding member 140, but is rotatably disposed at a contact area with the second sliding member 160 through a bearing means 160a is a significant characteristic of the present invention. The structure enables the spindle 170 to be smoothly positioned and accurately held a posture when the first rotating frame 130 and the second rotating frame 150 simultaneously rotate in different directions, respectively, and a corresponding description thereof will be described with reference to FIG. 6 below.

The variable machine tool 100 capable of multi-axis machining according to the exemplary embodiment of the present invention includes a single form of the spindle 170 for processing a processing target. While the spindle 170 is not separately illustrated, a position of the spindle 170 in a z-axis direction may be simultaneously adjusted by elevation and rotated in the same axis. In addition, a position and a posture of the spindle 170 facing the processing target may be adjusted toward the entity of the processing target according to the motions of the first rotating frame 130 and the second rotating frame 150 rotating individually or by interworking with each other in a direction in which the first rotating frame 130 and the second rotating frame 150 cross each other, thereby achieving a structure advantageous to the three-dimensional processing.

The base frame 110 simultaneously serves to fix the position of the second rotating frame 150, as well as the position of the first rotating frame 130, by connecting the first rotating frame 130 and the second rotating frame 150 inwardly and support the first rotating frame 130 and the second rotating frame 150 from the bottom. Further, the base frame 110 also serves to fix and arrange a plurality of driving motors 121a and 121b for providing driving force necessary to rotate the first rotating frame 130 and the second rotating frame 150. To this end, the base frame 110 generally includes a detailed configuration of a body portion 111, a supporting portion 113, and a vibration isolation member 115.

The body portion 111 includes a ring-shaped upper body 111a disposed at an outer side while having an interval with the first rotating frame 130 and a hemispherical lower body 111b protruding toward a lower side of the upper body.

A pair of first driving motors 121 for rotating the first rotating frame 130 is arranged on an upper surface of the upper body 111a in one direction (that is, an x-axis direction) while facing each other, and a pair of second driving motors 121b for rotating the second rotating frame 150 is arranged in a direction (that is, a Y-axis direction) crossing the one direction while facing each other.

Figure 3:
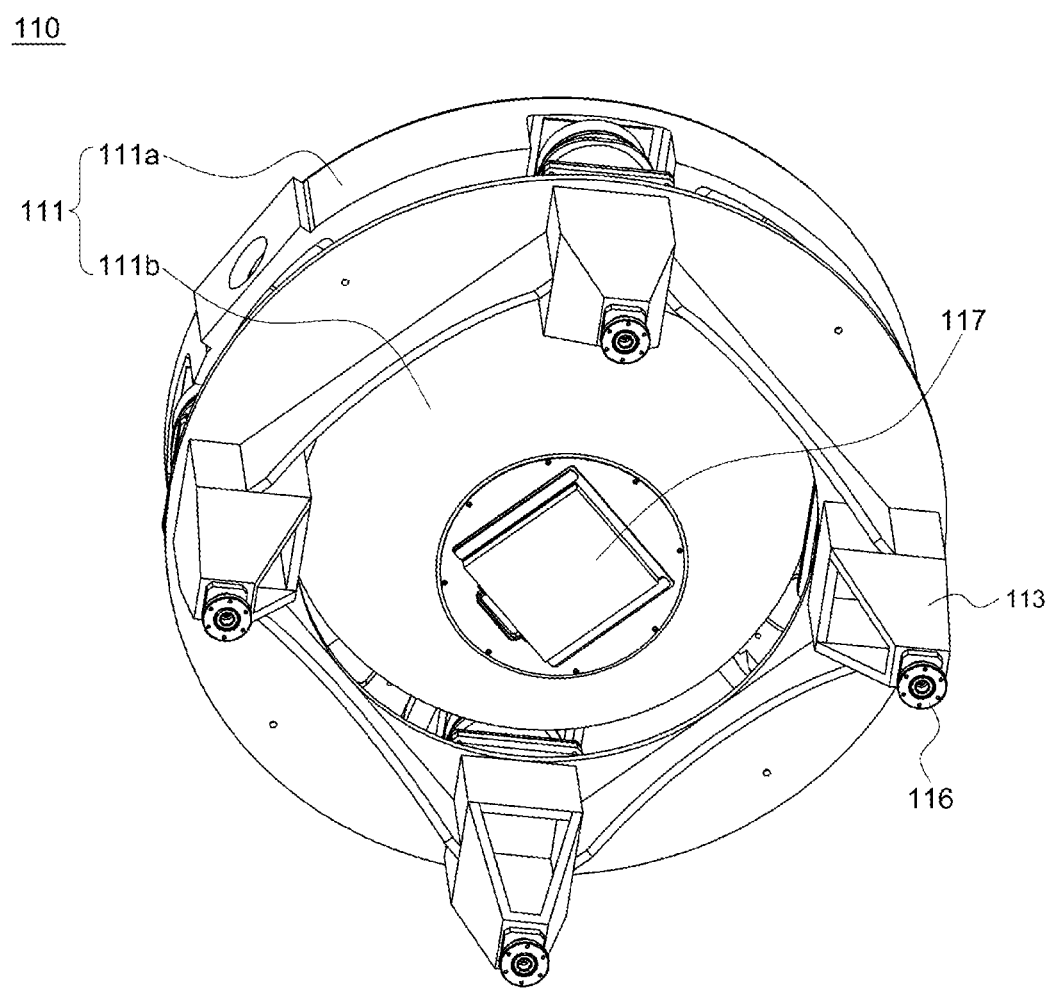
FIG. 3 is an enlarged drawing illustrating a base frame among constituent elements of the variable machine tool capable of multi-axis machining according to the exemplary embodiment of the present invention.

The lower body 111b is a hemispherical member extending and protruding downwardly from the interior diameter of the upper body, and serves to collect foreign substances including a chip discharged when the processing target is processed by the spindle 170. Particularly, an opening/closing door 117 may be provided at a bottom of the lower body 111b, and is used for collecting the collected foreign substance including the chip and discharging the collected foreign substances. A shape and a structure of the opening/closing door 117 may be identified with reference to FIG. 3. The opening/closing door 117 having an opening/closing structure in a sliding type is illustrated, but a structure of the opening/closing door 117 may be changed to an opening/closing structure in a hinged type by a hinge.

The supporting portion 113, which is a member supported to the bottom while having a uniform interval with a lower surface of the body portion 111 (especially, the upper body 111a), may include a plurality of legs (for example, four legs) stood from the bottom as illustrated in the drawing, and include a support 116 of which a height may be adjusted at an end of the supporting portion 113, that is, a portion that is in contact with and supported by the bottom.

The vibration isolation member 115 is inserted between the lower surface of the body portion 111 (especially, the upper body 111a) and an upper surface of the supporting portion 113 with a predetermined interval (for example, 90 degrees) to serve to absorb vibration generable during the processing. For a concrete example, an air cushion may be used. The vibration isolation member 115 may be disposed on the same line as a position at which the supporting portion 113 is in contact with and supported by the bottom, that is, on a portion at which the plurality of legs are positioned. The aforementioned disposal of the vibration isolation member 115 prevents peripheral vibration transmitted from the ground from being transmitted to the apparatus, so that it is possible to improve processing accuracy.

Next, the first rotating frame 130 and the second rotating frame 150 will be described.

The first rotating frame 130 is installed so as to be connected in the X-axis direction on the base frame 110 and rotate with respect to the X-axis, and includes the first sliding member 140 contact-supported through the interior diameter to slide along a circumferential route of the first rotating frame 130. Further, the second rotating frame 150 is installed so as to be disposed while crossing at an interior side of the first rotating frame 130, and connected in the Y-axis direction on the base frame 110 to rotate with respect to the Y-axis, and includes the second sliding member 160 sliding along a circumferential route of the second rotating frame 150 in the method same as or similar to that of the first sliding member 140. The detailed shapes and structures of the first rotating frame and the second rotating frame may be identified with reference to FIG. 4.

Figure 4:
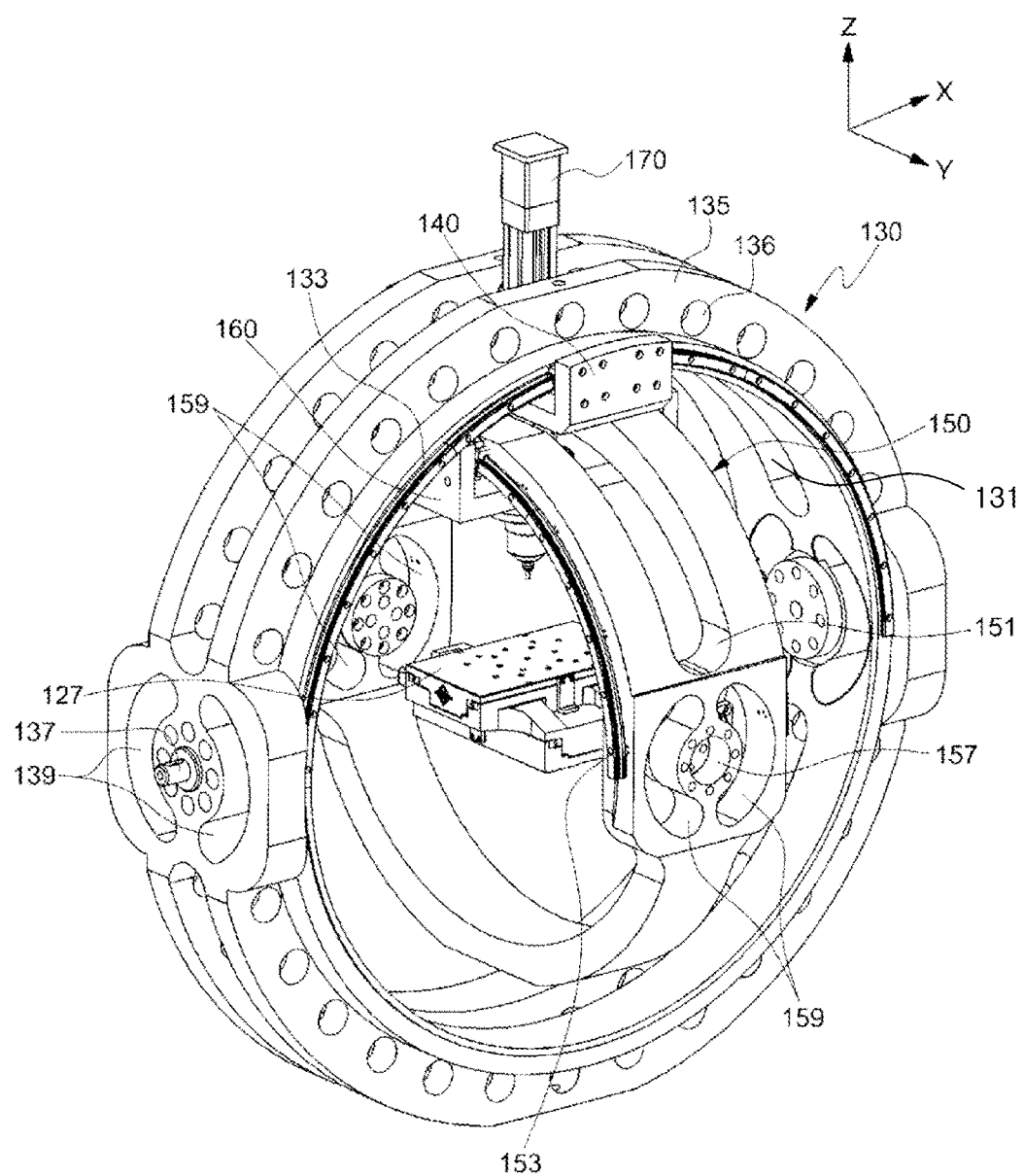
FIG. 4 is an enlarged drawing illustrating a first rotating frame and a second rotating frame among the constituent elements of the variable machine tool capable of multi-axis machining according to the exemplary embodiment of the present invention.

Referring to FIG. 4, the first rotating frame 130 has a structure installed in the X-axis direction on the base frame to rotate, and the second rotating frame 150 has a structure installed in a direction crossing the first rotating frame 130 at the interior side of the first rotating frame 130, that is, the Y-axis direction, to rotate. Further, the first rotating frame 130 and the second rotating frame 150 are all manufactured in a ring-shaped body, and a worktable 127 on which the processing target is seated and fixed is laid at a center of an interior space of the first rotating frame 130 and the second rotating frame 150. A structure of fixing the worktable 127 will be described with reference to FIG. 5 to be described below.

Particularly, elongated slits (referred to as "cylindrical elongated slits") 131 and 151 are provided at width centers of the first rotating frame 130 and the second rotating frame 140 in a circumferential direction, respectively, and the cylindrical elongated slits 131 and 151 serve as spaces through which the spindle 170 passes each of the first rotating frame 130 and the second rotating frame 150, installed, and transferred.

More specifically, a position and a posture of the spindle 170 are confined by the first sliding member 140 of the first rotating frame 130 and the second sliding member 160 of the second rotating frame 150. Further, the first sliding member 140 and the second sliding member 160 move in a circumferential direction of each frame when the first rotating frame 130 and the second rotating frame 150 rotate, and in this case, the spindle 170 connected to the respective sliding members moves in a predetermined direction. In this case, the cylindrical elongated slits 131 and 151 are formed at the respective rotating frames 130 and 150 so that the position and posture displacement of the spindle 170 may not be interfered by the first rotating frame 130 and the second rotating frame 150 and may turn in the circumferential direction of each of the first rotating frame 130 and the second rotating frame 150 without friction.

Further, a pair of arc-shaped elongated slits 139 facing each other is provided at both sides of a portion 137 with which the first rotating frame 130 is shaft-connected in order to receive power from a first driving motor (not illustrated). Similarly, a pair of arc-shaped elongated slits 159 facing each other is provided at both sides of a portion 157 with which the second rotating frame 150 is shaft-connected in order to receive power from a second driving motor (not illustrated). The arc-shaped elongated slits 139 and 159 are portions through which a plurality of connection members 125a and 125b of FIG. 5 connected from the first driving motor and the second driving motor, respectively, so as to fix the position of the worktable 127 passes to be installed. That is, the arc-shaped elongated slits 139 and 159 are provided within a predetermined range so that the first rotating frame 130 and the second rotating frame 150 fixedly installed by the plurality of connection members are not interfered during the rotation.

Further, rail portions 133 and 153 protrude outwardly in a direction of both sides of the lower part of the second rotating frame 150, as well as the first rotating frame 130. The rail portions 133 and 153 have a concavo-convex shape corresponding to each of the first sliding member 140 and the second sliding member 150, and serve as a running route so that the first sliding member 140 and the second sliding member 150 may freely move without being separated from the first rotating frame 130 and the second rotating frame 150 in a state where the first sliding member 140 and the second sliding member 150 are in contact with the first rotating frame 130 and the second rotating frame 150. Particularly, a well-known linear motion guide 161 of FIG. 6 and the like may be used.

In the meantime, a protrusion end 135 may be provided at the first rotating frame 130 in a direction in which the diameter extends, and a plurality of holes 136 arranged while being spaced apart from each other at a predetermined interval may be further provided at a cross section in a direction of a circumference of the protrusion end 135. The aforementioned structure corresponds to a structure for decreasing weight while achieving strength.

Figure 5:
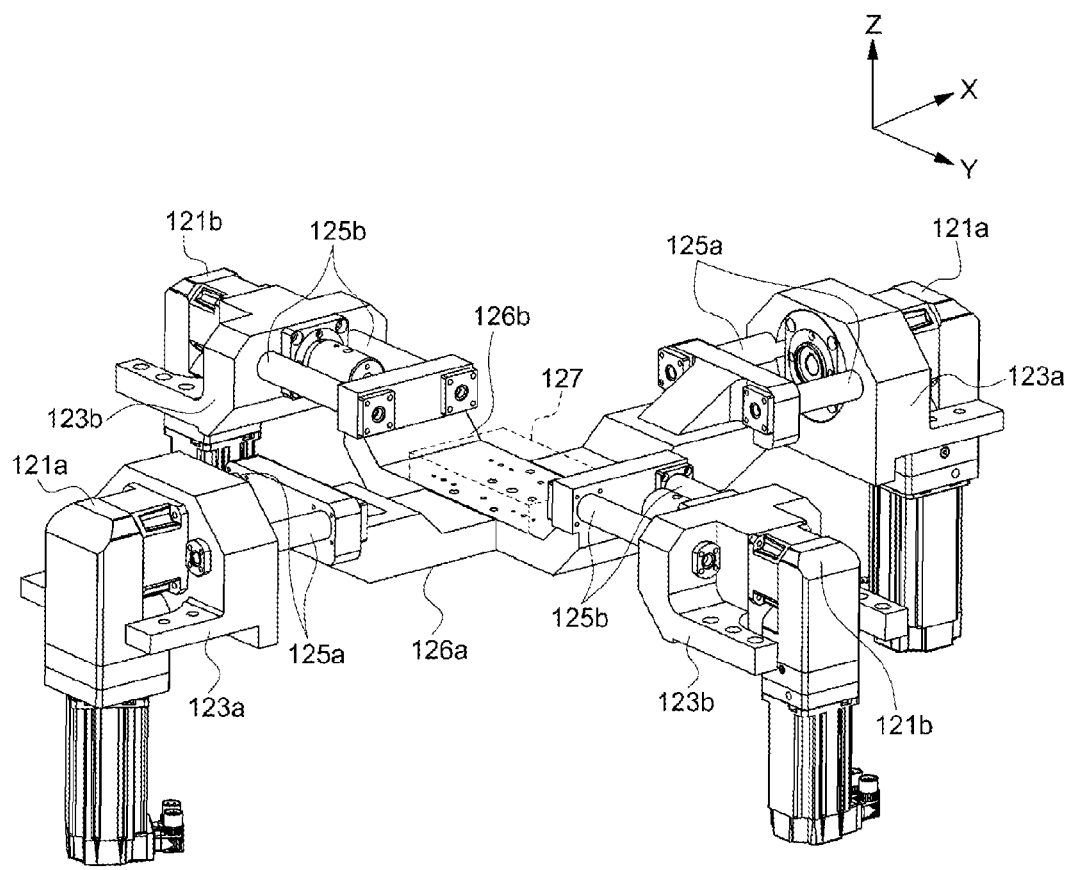
FIG. 5 is a drawing for describing a connection relationship between driving motors for driving the first rotating frame and the second rotating frame among the constituent elements of the variable machine tool capable of multi-axis machining according to the exemplary embodiment of the present invention.

FIG. 5 is a drawing for describing a connection relationship between the driving motors for driving the first rotating frame and the second rotating frame among the constituent elements of the variable machine tool capable of multi-axis machining according to the exemplary embodiment of the present invention.

Referring to FIG. 5, detailed constituent elements of the present invention simultaneously capable of rotating each of the first rotating frame and the second rotating frame and fixing the position of the worktable at the interior side are illustrated.

First, the aforementioned pair of first driving motors 121a for rotating the first rotating frame is spaced from each other in the X-axis direction on the base frame (especially, the upper body 111a of FIG. 1) to be fixedly arranged. On the contrary, the aforementioned pair of second driving motors 121b for rotating the second rotating frame is spaced from each other in the Y-axis direction on the base frame to be fixedly arranged. More particularly, the first driving motor 121a and the second driving motor 121b are fixed to the base frame by a first bracket 123a and a second bracket 123b for surrounding each driving motor housing thereof.

In the meantime, the worktable 127 is disposed at the center in the direction by which the first brackets 123 cross the second brackets 123b, and the plurality of connection members 125a and 125b are connected toward the worktable 127 to fix the position of the worktable 127. In this case, a first and second crossing supporter 126a and 126b cross-connected to provide a flat upper surface so that the worktable 127 is seated may be further provided at ends of the connection members 125 and 125b. Accordingly, the position of the worktable 127 may be fixed at the center of the interior space of the first rotating frame and the second rotating frame.

Figure 6:
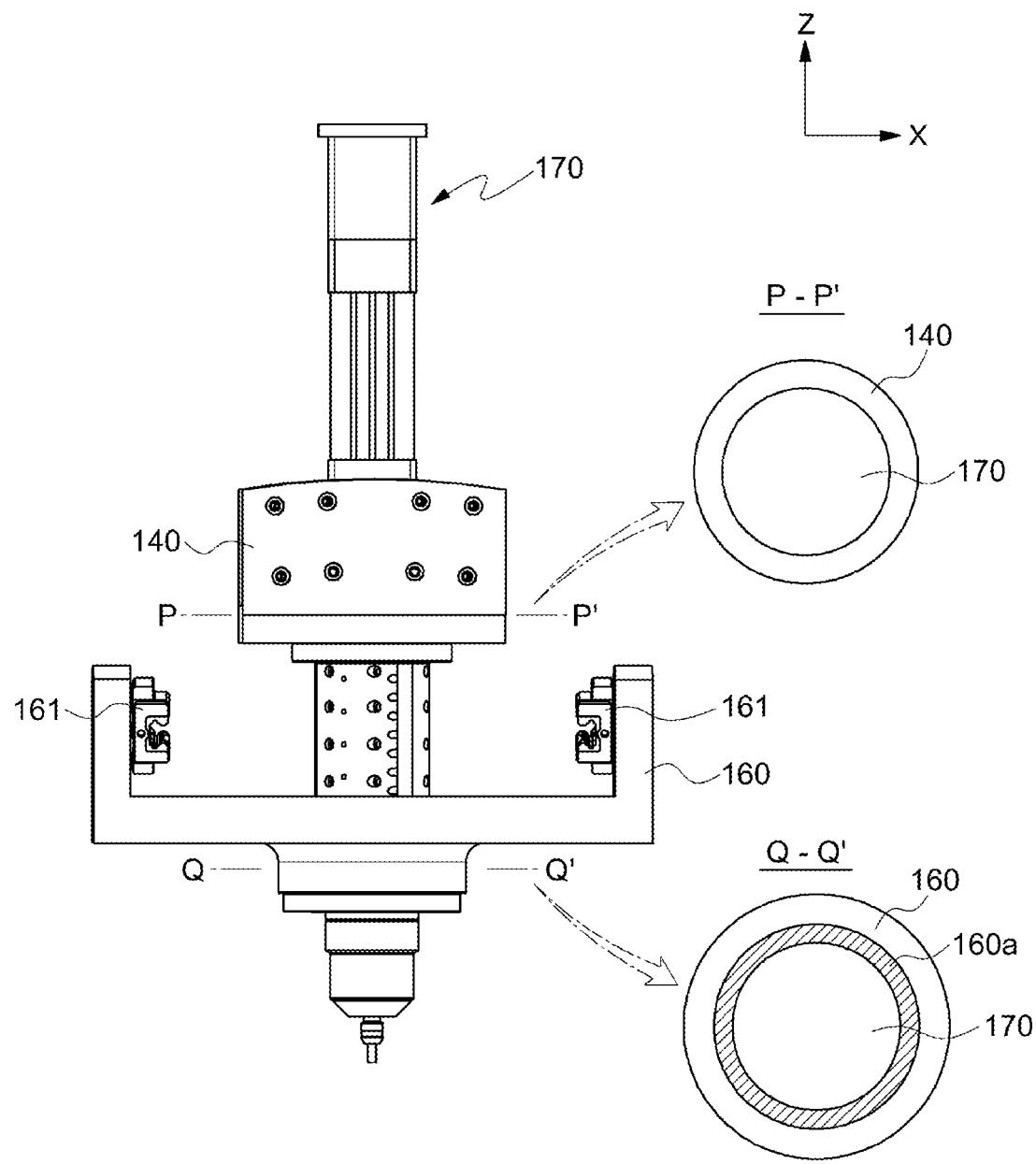
FIG. 6 is a drawing for describing a connection relationship between a spindle and a first sliding member and a second sliding member in the variable machine tool capable of multi-axis machining according to the exemplary embodiment of the present invention.

Next, a connection relationship between the spindle and the first sliding member and the second sliding member will be described. FIG. 6 is a drawing for describing a connection relationship between a spindle and a first sliding member and a second sliding member in the variable machine tool capable of multi-axis machining according to the exemplary embodiment of the present invention. Referring to FIG. 6, it can be seen that the first sliding member 140 is fixedly disposed at the center of the spindle 170 stood in the Z-axis direction, and the second sliding member 160 is further connected toward the lower side while having an interval with the first sliding member 140.

Particularly, while a connection structure of the spindle 170 and the first sliding member 140 has a structure in which the first sliding member is fixed to an outer circumferential surface of the spindle as can be seen through section P-P', a connection structure of the spindle 170 and the second sliding member 160 has a structure in which a bearing member 160a is further interposed at a side contacting the spindle as can be seen through section Q-Q'. Accordingly, the spindle has a freely rotatable structure. Accordingly, when the first rotating frame and the second rotating frame simultaneously rotate at a predetermined angle, the position and the posture of the spindle 170 may be smoothly set according to movement of the first sliding member 140 and the second sliding member 160 included in the first rotating frame and the second rotating frame, respectively.

When the spindle 170 has a connection structure fixed to both of the first sliding member 140 and the second sliding member 160, the spindle is fixed at two points spaced apart from each other, so that it may be difficult to accurately set the position and the posture of the spindle according to an intention of an operator when the first rotating frame and the second rotating frame simultaneously have rotating displacement. However, a shape of the bearing member 160a is simply expressed for convenience of the description, and the bearing member 160a may be changed to various shapes and structures. Further, a concrete example of the bearing member 160a may include a ball bearing, but various bearing members customarily used and widely utilized may be used as the bearing member 160a.

As described above, according to the variable machine tool capable of multi-axis machining according to the exemplary embodiment of the present invention, processability may be improved compared to the related art by applying a driving mechanism in which a rotary motion is maximized. Particularly, the variable machine tool capable of multi-axis machining according to the exemplary embodiment of the present invention may be used even in the BT and IT micro processing fields. Particularly, by simultaneously applying a mechanical structure capable of performing a two-axial rotary motion and three-axial translation, it is possible to simplify a complex configuration of the multi-axis machine tool of the related art compared to the related art and perform more complex and finer processing.

Further, according to the variable machine tool capable of multi-axis machining according to the exemplary embodiment of the present invention, the spindle may be smoothly transferred in a predetermined direction by interworking with the rotation of the pair of rotating frames which are cross-arranged. This may be achieved by changing a design of a connection structure of the sliding members and the spindle provided between the respective rotating frames. That is, the connection between the first sliding member and the spindle inside the rotating frame in the X-axis direction may be fixed, and the second sliding member and the spindle inside the rotating frame in the Y-axis direction may be connected in a state where contact friction therebetween is decreased. Accordingly, the spindle may hold an accurate posture in a predetermined direction even when the spindle is simultaneously guided according to the X-axis rotating frame and the Y-axis rotating frame to be transferred. Accordingly, processability is improved.

Until now, the exemplary embodiment of the present invention of the variable machine tool capable of multi-axis machining has been described.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 100: Variable machine tool capable of multi-axis machining | |
| 110: Base frame | |
| 111: Body portion | |
| 110a: Upper body | 110b: Lower body |
| 113: Support portion | 115: Violation isolation member |
| 116: Supporter | 117: Opening/closing door |
| 121a: First driving motor | 121b: Second driving motor |
| 123a: First bracket | 123b: Second bracket |
| 125a: First connection member | 125b: Second connection member |
| 126a: First crossing supporter | 126b: Second crossing supporter |
| 127: Worktable | |
| 130: First rotating frame | |
| 131: Cylindrical elongated slit of first rotating frame | |
| 133: Rail portion of first rotating frame | |
| 135: Protrusion end | 136: Hole |
| 139: Arc-shaped elongated slit of first rotating frame | |
| 140: First sliding member | |
| 150: Second rotating frame | |
| 151: Cylindrical elongated slit of second rotating frame | |
| 153: Rail portion of second rotating frame | |
| 159: Arc-shaped elongated slit of second rotating frame | |
| 160: Second sliding member | 160a: Bearing member |
| 161: Linear motion guide | |
| 170: Spindle | |

What is claimed is:

1. A variable machine tool capable of multi-axis machining, comprising:
   a base frame;
   a first rotating frame disposed on the base frame rotating about a first axis and connected to a first sliding member sliding along an inner circumference of the first rotating frame;
   a second rotating frame disposed inside the first rotating frame to rotate about a second axis perpendicular to the first axis, and connected to a second sliding member sliding along an inner circumference of the second rotating frame; and
   a spindle,
   wherein the position and posture displacement of the spindle is adjusted when the first sliding member and the second sliding member slide by interworking with rotation of the first rotating frame and the second rotating frame, the spindle being installed in the machine tool so as to pass through the first sliding member and the second sliding member,
   wherein the spindle is fixedly coupled to the first sliding member, and the spindle is rotatably coupled to the second sliding member,
   wherein the first and second sliding members are spaced apart from each other, and
   wherein the base frame comprises a body portion comprising a ring-shaped upper body disposed at an interval with the first rotating frame, and a hemispherical lower body protruding from a lower side of the upper body,
   a pair of first driving motors for rotating the first rotating frame is arranged in the first axis direction,
   a pair of second driving motors for rotating the second rotating frame is arranged in the second direction,
   the upper body has four holes, and
   the pair of first driving motors and the pair of second driving motors are inserted in the four holes respectively and mounted on the upper body thereby.

2. The variable machine tool capable of multi-axis machining of claim 1, wherein:
   the base frame further comprises:
   a support portion for making the body portion stand, and configured for supporting the body portion from a bottom of the body portion; and
   a vibration isolation member interposed between the body portion and the support portion to absorb vibration, the vibration isolation member being disposed on the same line as a position at which the support portion supports the bottom of the body portion.

3. The variable machine tool capable of multi-axis machining of claim 2, wherein:
   a worktable on which a processing target is seated is fixedly disposed inside the upper body.

4. The variable machine tool capable of multi-axis machining of claim 2, wherein:
   a door for discharging a chip is provided at the lower body of the body portion.

5. The variable machine tool capable of multi-axis machining of claim 1, wherein:
   a first elongated slit is formed at a width center of the first rotating frame along a circumference of the first rotating frame, a second elongated slit is formed at a width center of the second rotating frame along a circumference of the second rotating frame, and
   each of the first and second elongated slits has a width size so that the spindle moves along the circumference of the first rotating frame and along the circumference of the second rotating frame with reduced friction in a state where the spindle passes through the elongated slits.

6. The variable machine tool capable of multi-axis machining of claim 1, wherein:
   the first sliding member slides along a first rail portion protruding from a side of the first rotating frame, such that the first sliding member is contact-supported on the first rail portion, and
   the second sliding member slides along a second rail portion protruding from a side of the second rotating frame, such that the second sliding member is contact-supported on the second rail portion.

7. The variable machine tool capable of multi-axis machining of claim 1, wherein:
   a bearing member is located at an interior diameter of the second sliding member so that the spindle is freely rotatable in a state where the spindle is in contact with the bearing member.

* * * * *